May 24, 1932.    G. E. JANSSON    1,859,447
ELECTRICAL DISTRIBUTION PROTECTIVE SYSTEM
Filed June 15, 1929

Inventor.
Gustav E. Jansson
atty

Patented May 24, 1932

1,859,447

UNITED STATES PATENT OFFICE

GUSTAV E. JANSSON, OF ATLANTIC, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

ELECTRICAL DISTRIBUTION PROTECTIVE SYSTEM

Application filed June 15, 1929. Serial No. 371,201.

This invention relates to electrical distribution systems which are divided into a plurality of sections with switches controlling the connection between the sections and particularly to ring feeder systems which are energized at two or more points, and wherein the connected load is distributed over the several intermediate sections.

When a permanent fault, as a short circuit, occurs in a section or its connected distribution circuits, it is desirable to isolate that particular section from the system while maintaining the remaining unaffected sections energized; and it is an object of this invention to provide a sectionalizing switch for controlling the connections between adjacent sections having means associated therewith automatically to open the switches at the ends of a section upon the occurrence of a permanent fault and to keep the switches open and thereby isolate the faulty section from the other sections and permit service on the remainder of the system to be continued.

A further object of the invention is the provision of an automatically reclosing sectionalizing switch having improved means associated therewith which are responsive to conditions of the next adjacent circuit sections to govern the closing of the switch.

A yet further object of the invention is the provision of a multi-section ring feeder system having section-connecting switches which are adapted to open and close in accordance with a predetermined duty cycle upon the occasion of a fault whereby if the fault shall persist, those switches connecting the normal feeder sections will be left in closed position and the switches at the ends of a faulty section will be locked open.

It sometimes happens with reclosing section switches which are arranged to reclose automatically upon resumption of normal conditions in the circuit that the switch reclosing means is not disabled when it is desired to repair the fault and, upon removal of the fault by the workman, the voltage is immediately and automatically impressed upon the section with fatal consequences. It is therefore an object of the invention to provide a multi-section feeder system having automatically reclosing section switches which are permanently locked out upon the occurrence of a fault of a permanent nature and are thus prevented from reclosing regardless of the subsequent removal of the fault.

A further object of the invention is to improve sectionalized distribution systems provided with automatic section connecting switches in order that all sections may be utilized in the most efficient manner and interruptions to service may be reduced to a minimum.

Figure 1:
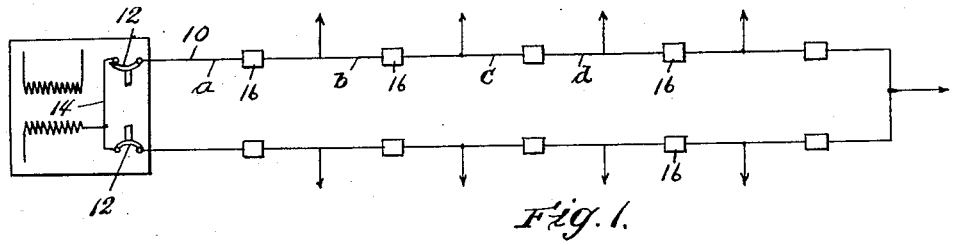
Fig. 1 is a diagrammatic showing of a single line or phase of a multi-section ring feeder system having sectionalizing switches connecting the adjacent sections.
Figure 2:
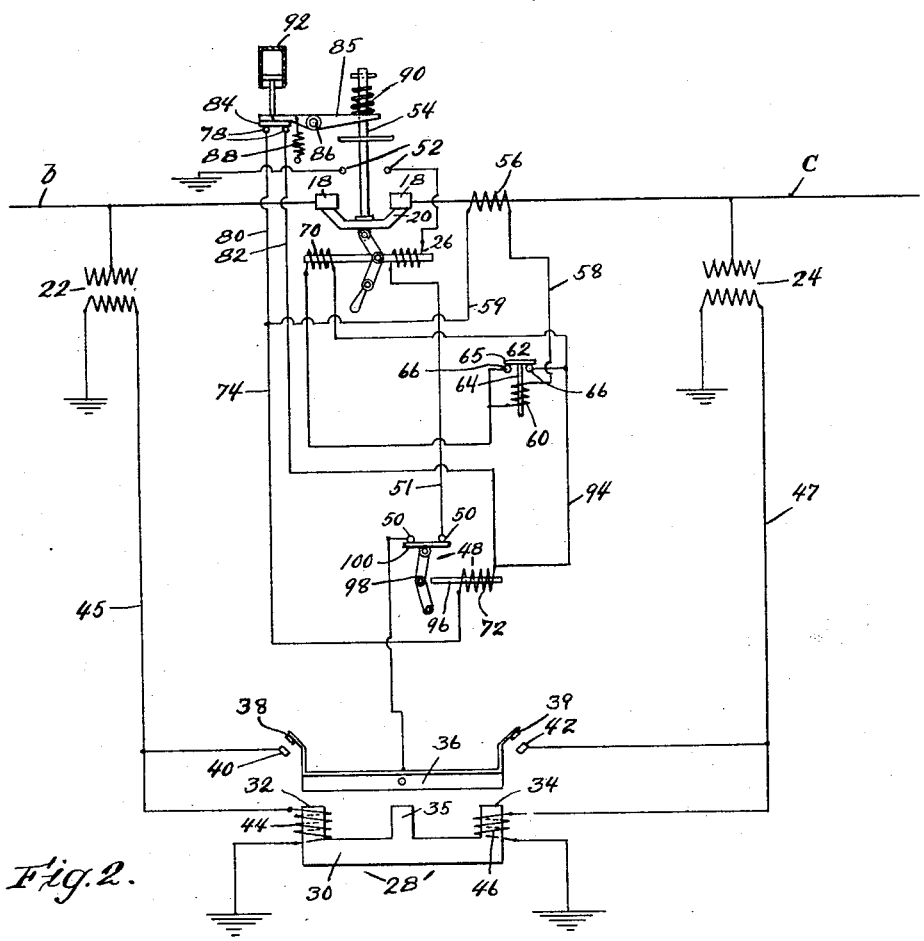
Fig. 2 is a diagrammatic showing of a section connecting switch with which this invention is particularly concerned.

Fig. 1 illustrates one phase of a sectionalized distribution system wherein the line conductor 10 is extended in a loop throughout the district served by the system and the terminals of the loop are connected at the substation through switches 12 with a common bus 14. The conductor may be composed of a plurality of sections $a$, $b$, $c$, $d$, etc., and the sections are adapted normally to be connected in series by automatically reclosing sectionalizing switches 16. The sectionalizing switches 16 are provided with overload responsive tripping means and are adapted to trip open in unison upon occurrence of a fault at any point in the line conductor 10. Thus, the ring feeder is simultaneously interrupted at a plurality of points in the line which reduces the interrupting requirements of the switches and permits the use of smaller switches than would be the case if any one switch were required to open the conductor line alone.

Each sectionalizing switch 16 includes a pair of contact members 18 each of which is connected with a conductor of adjacent sections to be connected and a cooperating movable brush member 20 which is adapted to bridge said contacts 18 and connect the sections. Means are provided which are responsive to the potential in either section $b$ or $c$ to close the switch. Said means includes the potential transformers 22 and 24 energized respectively by sections $b$ and $c$, the closing coil 26 and a throw-over relay 28 provided for selectively energizing the closing coil 26 when either section $b$ or $c$ or both sections $b$ and $c$ are energized. Said relay comprises a core member 30 having a pair of upstanding legs 32 and 34 and an intermediate upstanding leg 35 which provides a support for a massive pivoted armature 36 which is provided with two contact members 38 and 39 at its opposite ends which are adapted to engage cooperating fixed contact members 40 and 42. A coil 44 is provided on leg 32 of said core 30 and is connected across the secondary of the potential transformer 22 by a conductor 45. A similar coil 46 connected by a conductor 47 with the secondary of transformer 24 is provided on leg 34 of said core. The engagement of the contacts 38, 40 or 39, 42 controlling the closing coil 26 is slightly delayed upon energization of coil 44 or 46 due to the inertia of armature 36 for reasons which will subsequently become evident. The lockout relay 48 having contacts 50 in a conductor 51 of the electric circuit including closing coil 26 is arranged to disable said closing coil circuit under some conditions as will hereinafter be described. An auxiliary switch having the fixed contacts 52 in the circuit of closing coil 26 is carried by the movable switch rod 54 of switch 16, and is adapted to be opened soon after the closing of the switch in a more or less usual manner to deenergize the closing coil circuit.

Means are associated with each section switch 16 to trip the switch open upon the occurrence of overload anywhere in the line conductor 10. Said means includes a current transformer having a secondary 56 which is connected through conductors 58 and 59 with a current coil 60 of an overload responsive relay 62. Said overload relay includes a solenoid plunger 64 or equivalent which carries a movable contact bridging member 65 that is adapted normally to bridge a pair of fixed contact members 66 which are included in the circuit including conductors 58 and 59. A trip coil 70 is adapted to shunt said contacts 66. It will be evident, upon an overload condition in line conductor 10, that the current induced in the secondary 56 will cause the overload relay 62 to open its contacts 66, whereby to pass the overload current through the shunt circuit including trip coil 70 and open the section switch. The current responsive coil 72 of lockout relay 48 is likewise connected in the circuit including conductors 58 and 59 so that the secondary current flowing in said transformer secondary 56 may pass through conductor 58, conductor 94, coil 72, conductor 74, and conductor 59. Means is provided, however, normally to prevent the current in the secondary 56 from traversing the coil 72 of the lockout relay. Said means includes a pair of normally closed contacts 78 which are connected across said coil 72 by means of conductors 80 and 82 whereby the current normally flows to conductors 58, 94, 82, contacts 78, conductors 80, and 59, thus providing a short circuit path across the lockout relay coil 72 and rendering it normally inoperative. Said contacts 78 are adapted to be bridged by a movable contact 84 which is operatively connected with the movable switch rod 54 of the section switch 16. Said connection includes an operating arm 85 pivoted at 86 and normally biased by a spring 88 into a position to cooperate with and bridge the contacts 78. Said arm 85 is bifurcated at its free end to receive the switch operating rod 54, and a spring 90 is provided on said rod which is adapted when the switch is opened to be compressed and act against said arm 85 to bias it continuously into a position to open said contacts 78. The spring 90 is adapted to be relatively stronger than the biasing spring 88 whereby upon opening of the switch, the contact 84 will move into its open position. A dashpot 92 is connected to said arm 85 whereby to retard the movement thereof both in a contact opening and contact closing direction so that the opening and closing of the shunt contacts 78 always lags slightly behind the opening and closing of the section switch 16.

Assuming the section switches 16 to be closed and normal conditions prevailing throughout the system, and the bus 14 to be energized, the operation of the system is as follows:

If a fault occurs on any section, as the section $c$, an overload current will flow in the transformer secondaries 56 of all the section switches 16. Consequently the solenoid 64 of the overload relay 62 associated with each section switch will be raised to open the contacts 66 and a circuit will be completed through conductor 58, coil 60, trip coil 70, conductors 94, 82, contacts 78 and 84, conductors 80 and 59, thus effecting the simultaneous overload tripping of all the section connecting switches. The auxiliary switches of the section switches including the contact 52 will now be closed and under the influence of the compression spring 90, the arm 85 will be biased, subject to the retarding influence of the dashpot 92, into a position wherein contacts 78 will be opened. Ordinarily the bus connecting switches 12 at the station will be immediately reclosed, thus impressing a voltage on the two end-sections of the system. As voltage is impressed on each successive section, the throw-over relay 28 of each section switch will be energized by the potential in the preceding section. Thus, when section $b$ becomes energized, a circuit is established through the secondary of the potential transformer 22, conductor 45, contacts 38 and 40 of the throw-over switch, armature 36, the closing coil 26 and auxiliary switch contact 52, thus to complete the circuit and effect the closing of the switch 16 connecting it with one end of section c. Since the arm 85, however, lags somewhat behind the section switch 16 in closing, it will be evident that contacts 78 will remain open after the switch 16 has closed and section c which contains the fault has been energized. An overload current will now flow in the line conductor 10 and all of the section switches 16 in that side of the loop which is first connected to section c will again be tripped open in the manner before described. Due to the fact, however, that the contacts 78 of the section switch 16 adjacent the faulty section c remains open when the faulty section is energized, the overload current in the secondary of transformer 56 will flow through the coil 72 of the lockout relay 48, the shunt path across this coil including contacts 78 and 84 being now open; and as a consequence, the solenoid 96 of the lockout relay will break the toggle 98, causing the movable contact member 100 to open the closing coil circuit at the contacts 50 therein. The sections on the other side of the loop are similarly successively energized until the faulty section c is again connected to the station bus at its other end, whereupon the section switches 16 on said other side of the section c open upon overload and the switch 16 connecting sections c and d is locked open by reason of the open condition of the contacts 78, as previously described. Thus, it will be seen that, while all of the section switches 16 are again opened upon overload, the section switches 16 at the ends of section c are both locked out so that they cannot be reclosed. Only those section switches at the ends of section c, however, will be locked out since the coil 72 of the lockout relay is set to operate only on overload current such for instance as the setting of overload relay 62. The section switches 16 beginning at the end-sections adjacent the station will again reclose, connecting section after section in series until the switches at the ends of section c are the only ones that remain open, thus isolating section c from the system while permitting the energization of all other sections.

It will be noted that the coil 44 of the throw-over relay 28 is provided with a few more turns than the coil 34 connected with the next adjacent section, or is otherwise arranged, so that when both sections b and c are energized, the coil 44 will be selected to close the contacts 38 and 40. In this way, the relay is biased to close contacts 38 and 40 unless section c alone is energized.

Various modifications may be made in the connection and choice of relays and other apparatus without departing from the scope of this invention.

I claim:
1. An electrical distribution system having two electrically independent feeder sections, a switch connecting said sections, means to trip said switch upon overload, electrically operative closing means for said switch, means selectively to energize said closing means from either section, means to disable said closing means including an overload responsive device, a pair of contacts normally shunting said device, and time-controlled bridging means for said contact members operatively associated with said switch arranged to open said shunt contact members when the switch is opened, and also to close said contact members at some predetermined time after the closing of the switch, whereby to render said device operative upon closing of the switch to disable said closing means if an overload exists.

2. An electrical distribution system having two electrically independent feeder sections, a switch connecting said sections, means to trip said switch upon overload, electrically operative closing means for said switch, means selectively to energize said closing means from either section, means to disable said closing means including an overload responsive device, a pair of contacts normally shunting said device, bridging means for said contact members operatively associated with said switch arranged to open said shunt contact members when the switch is opened, whereby to render said device operative upon closing of the switch to disable said closing means if an overload exists, and time delayed means associated with said bridging means arranged to retard the bridging of said shunting contact members until after the switch is closed.

3. An electrical distribution system having two electrically independent feeder sections, a switch for connecting said sections, overload tripping means for the switch, and electrically operated closing means for said switch, said closing means including two windings, means to energize each of said windings from a separate one of said sections and an armature common to and inductively related to both of said windings and operative in response to the energization of either or both of said windings to effect the energization of said closing means.

4. A distribution system including a plurality of electrically independent feeder sections, switches for connecting together said sections, tripping means responsive to an overload condition in any section to trip all of said section-connecting switches simultaneously, means to reclose said switches in succession, and means operative during a second tripping operation of said tripping means to effect the disabling of the reclosing means of any of said switches which in closing connects the faulty section to the system.

5. An electrical distribution system having electrically independent feeder sections, a switch connecting said sections, means to trip said switch upon overload, electrically operated closing means for said switch, means selectively to energize said closing means from either section, means to disable said closing means, including an overload responsive relay, means including a pair of contacts controlling the circuit of said relay and arranged normally to render said relay inoperative to disable said closing means, means responsive to opening and closing movements of the switch to open and close said contacts, and means to delay said latter means whereby to permit said breaker to close with said overload responsive means operative to disable said closing means if an overload exists.

6. An electric distribution system including a plurality of serially connected feeder sections, switches connecting the several sections having overload responsive tripping means associated therewith, electrically operated closing means for each of said switches, means for energizing the closing means for said switches to effect the automatic closing thereof in succession in response to the successive energization of said sections, a lock-out relay responsive upon the overload tripping of a switch arranged when operated to disable the closing means for its switch, and means associated with each switch arranged normally to disable said lock-out relay and prevent its operation, said means being ineffective to disable said lock-out relay for a predetermined time interval immediately following the closing of the switch, whereby to permit said lock-out relay to operate if an overload exists on the next feeder section only which is encountered by the closing of its switch.

In testimony whereof, I have signed my name to this specification.

GUSTAV E. JANSSON.